Dec. 6, 1960
E. L. GRAEF
2,963,184
CAR TOP BOAT LOADING MECHANISM
Filed May 27, 1958
3 Sheets-Sheet 1
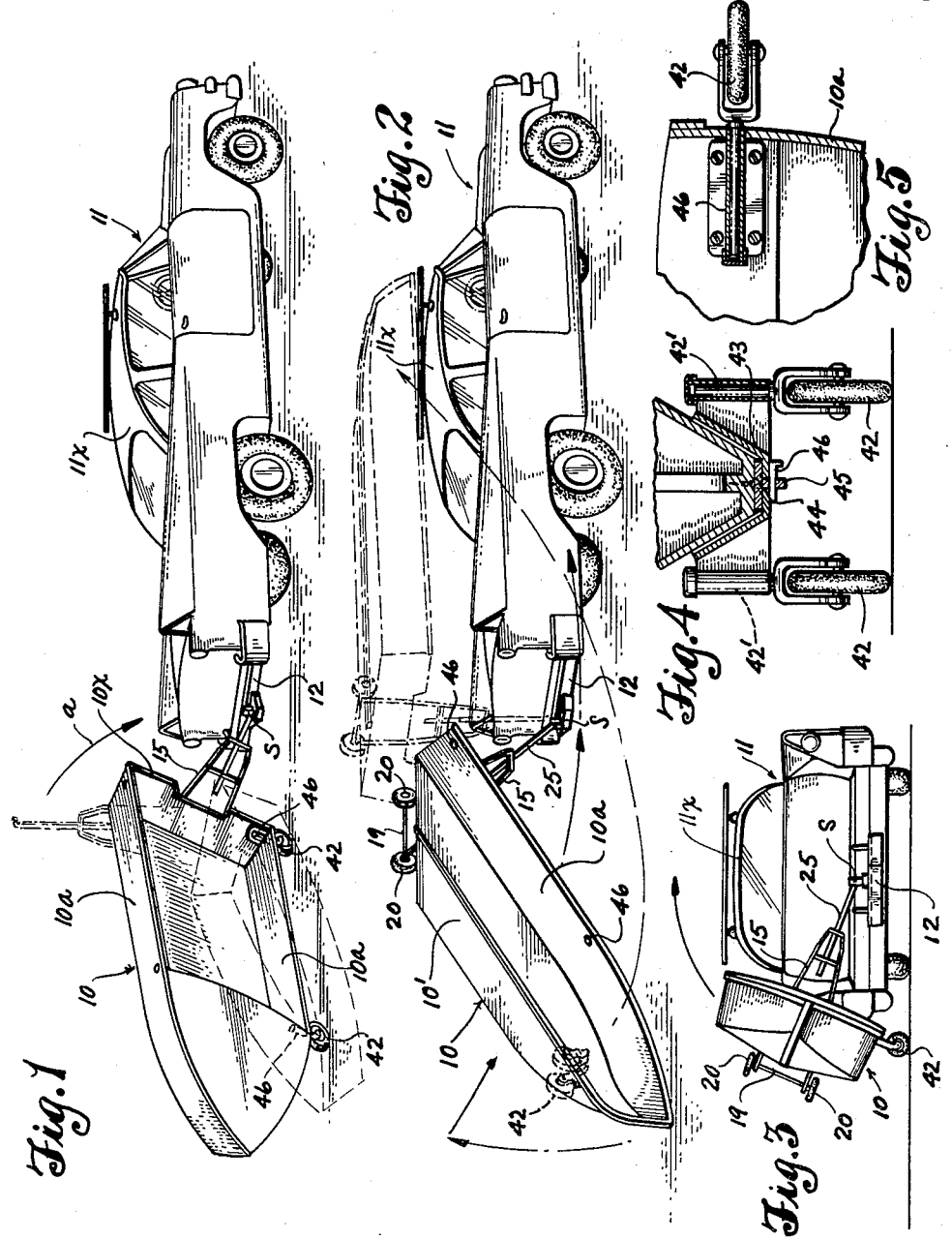
INVENTOR.
EDWARD L. GRAEF
BY
Robinson & Berry
ATTORNEYS Dec. 6, 1960
E. L. GRAEF
2,963,184
CAR TOP BOAT LOADING MECHANISM
Filed May 27, 1958
3 Sheets-Sheet 2
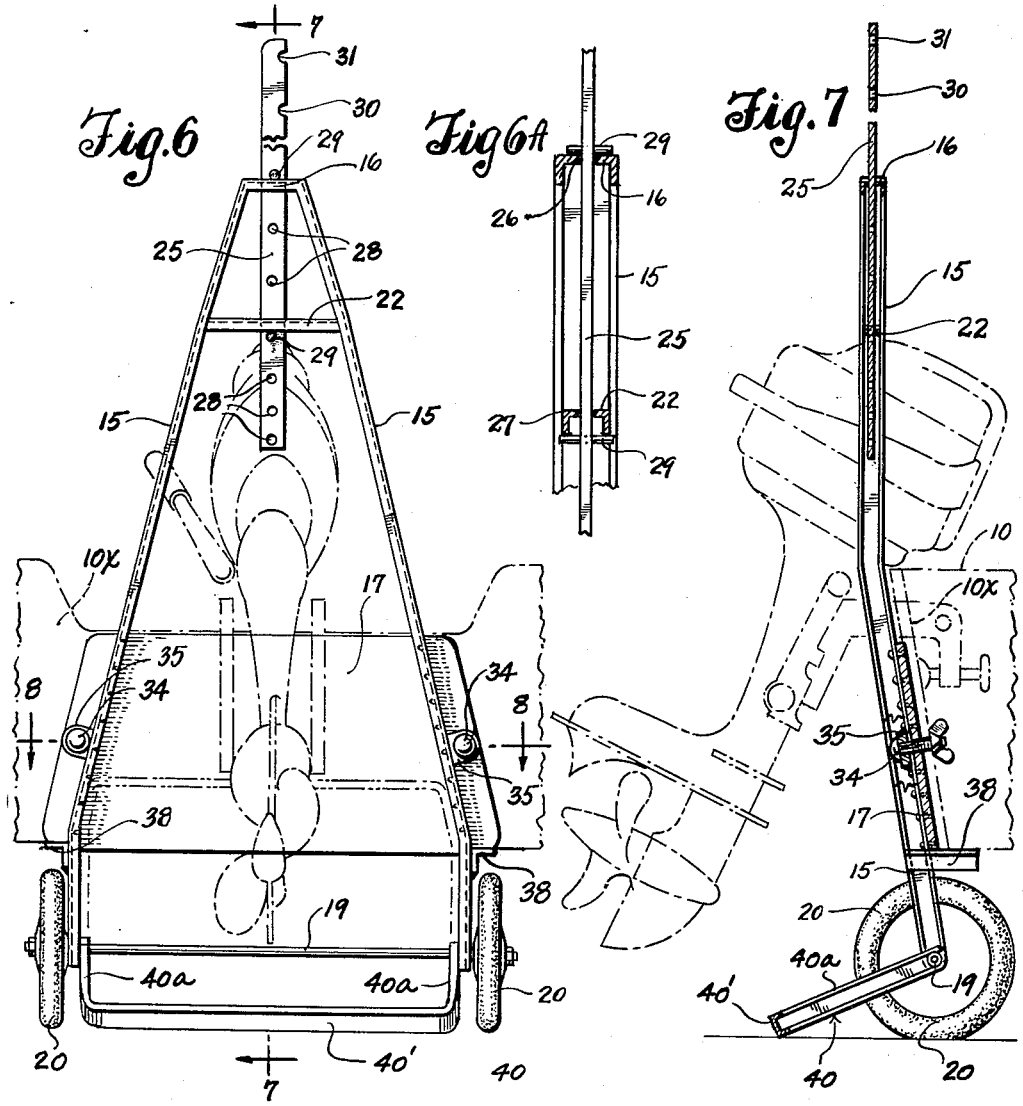
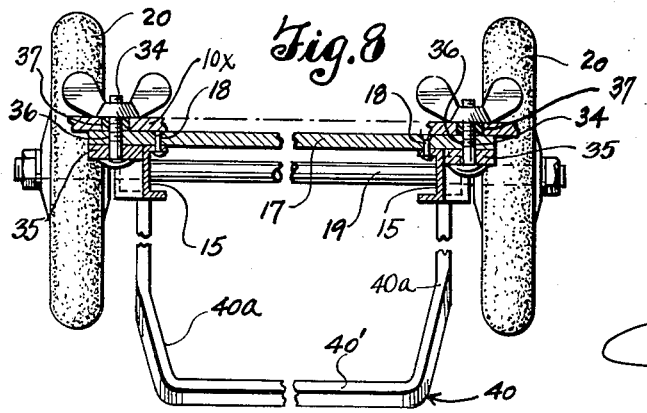
INVENTOR.
EDWARD L. GRAEF
BY
Robinson + Berry
ATTORNEYS Dec. 6, 1960
E. L. GRAEF
2,963,184
CAR TOP BOAT LOADING MECHANISM
Filed May 27, 1958
3 Sheets-Sheet 3
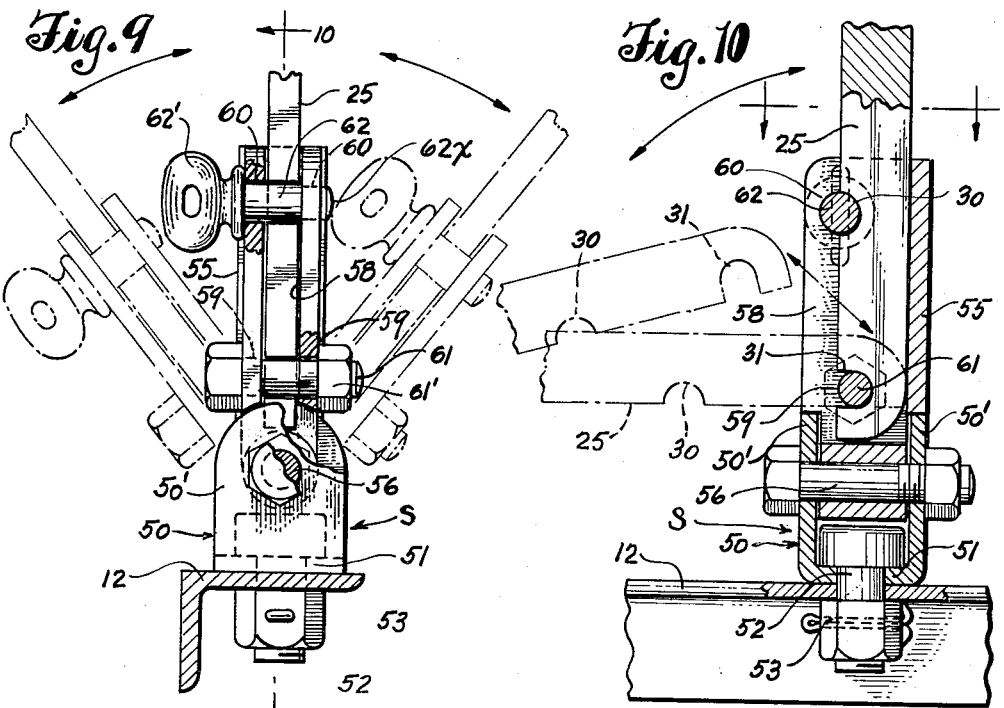
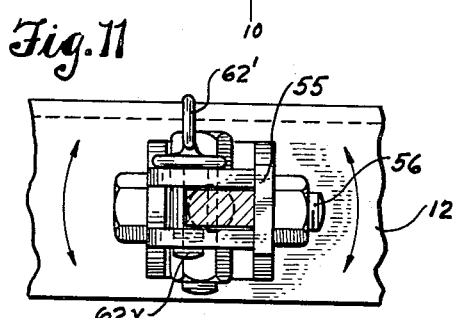
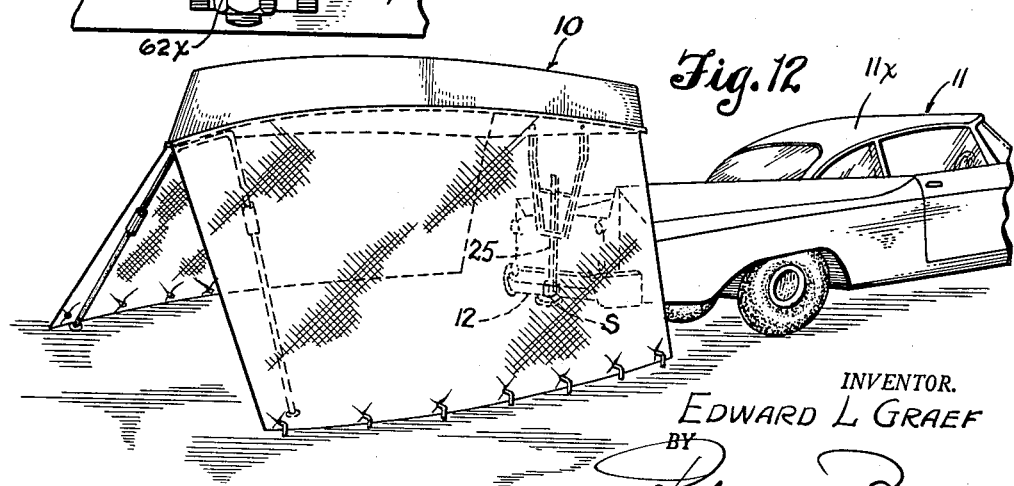
INVENTOR.
EDWARD L. GRAEF
BY
Robinson & Berry
ATTORNEYS United States Patent Office 2,963,184
Patented Dec. 6, 1960

2,963,184
CAR TOP BOAT LOADING MECHANISM
Edward L. Graef, Lynnwood, Wash.
(6728 128th SW., Edmonds, Wash.)
Filed May 27, 1958, Ser. No. 738,196
8 Claims. (Cl. 214—450)

This invention relates to devices for automobile top boat loading and carrying operations. More particularly, it has reference to an improved means or mechanism that is applicable to a boat of the conventional form, as generally used for rowing and pleasure fishing, whereby the boat may be quickly, easily and safely loaded for transportation onto the top of an automobile and safely supported thereon during transportation to and from a place of use.

It is a further object of the present invention to provide a novel form of boat moving and loading lever or standard, which may be temporarily fixed to the transom end of the boat for use initially as an aid in moving the boat into loading position, and then for tipping it as required for connection of the lever to the automobile and finally for supporting the boat in transporting position on the automobile top.

It is also an object of the present invention to provide a novel swivel type of mounting that is adapted to be fixed to a typical or standard form of trailer hitch when installed on the boat transporting automobile for the mounting of the standard or lever for the loading operation, which operation requires that the boat be turned and carried from a position rearwardly of the automobile to a forwardly directed position of support upon the automobile top.

It is also an object of the present invention to provide casters and means for their easy and ready application to the boat for temporary use as means for facilitating the tilting and positioning of the boat for loading and for its movement into and from the water.

It is a further object of the present invention to provide a combined loading lever and supporting standard as above disclosed that may also be used as a wheeled dolly to aid in moving the boat to and from loading position and into and from the water.

Further objects and advantages of the invention reside in the details of construction and combination of parts embodied therein and in the mode of use of the device, as will hereinafter be fully described.

In accomplishing the above mentioned and other objects of the invention, I have provided the improved details of construction, the preferred forms of which are illustrated in the accompanying drawings, wherein:

Fig. 1 is a perspective view showing a boat and automobile as equipped with the means embodied by the present invention for loading a boat onto the automobile top; this view also illustrating the initial operation of tipping the boat on edge, after the loading standard has been attached thereto, for application of the end of the standard to the swivel as mounted on the trailer hitch.

Fig. 2 is a similar perspective view showing, in full lines, the boat as inverted for loading and in dotted lines showing the boat as loaded onto the automobile top and as supported by said standard.

Fig. 3 is a rear end view of the boat and automobile in the relative positions in which they are seen in Fig. 1.

Fig. 4 is a detail of paired prow and casters as applied to the boat for use as an aid for moving the boat to loading position and also for use in moving it into and from the water.

Fig. 5 is a sectional detail showing the manner of mounting a caster on the gunwale for rolling support and movement of the boat when in a tilted position as shown in Fig. 1.

Fig. 6 is a stern end elevation of the boat with the loading and supporting standard of the present invention fixed thereto, Fig. 7 is a vertical section taken on the line 7—7 in Fig. 6.

Fig. 8 is a horizontal section taken on lines 8—8 in Fig. 6.

Fig. 9 is an enlarged side view of the swivel as mounted on the trailer hitch for attachment and support of the loading lever.

Fig. 10 is a vertical section taken on line 10—10 in Fig. 8.

Fig. 11 is a horizontal section taken on line 11—11 in Fig. 10.

Fig. 12 is a perspective view showing use of the present boat supporting lever to support one end of the boat when used in making a tent.

Referring more in detail to the drawings:

The type of automobile most suitable for the present mode of transporting a boat of the kind shown is that designated as the "hard top sedan." However, any motor vehicle with a rigid top structure, if otherwise suitable, might be employed and it is not the intent that the present boat loading and carrying device be limited to use with any specific type or make of motor vehicle. In the present specification, the term "car" or "automobile" will be used to indicate a vehicle that is suitable for the present purpose whether it be of the form here shown or of any other type.

The type of boat to be loaded by the present device for transportation would ordinarily be of the row boat type, that is a boat without upper structure, such as, for example, any one of the present day makes of pleasure boats of the type herein illustrated, which may be made of wood, plastic, fiber glass or from combinations of such materials. Usually such boats range in length from eight to fourteen feet and are from three to five feet in width.

The boat herein shown is designated in its entirety by numeral 10. It is formed with the usual bottom, 10', opposite sidewalls 10a and 10a and a transom wall 10x. It is shown as having a pointed prow.

In the accompanying drawings the car used for highway transportation of the boat is designated in its entirety by numeral 11 and is shown in Figs. 1, 2 and 3 that it has a top structure 11x suitable for carrying the boat thereon, and is equipped at the rear end with a standard trailer hitch 12 with ball removed, to which the part herein designated as "the swivel" is bolted. This swivel, designated generally in Figs. 1, 2 and 3 by reference letter S will be presently described in detail.

The boat loading standard and support embodied by this invention is best shown in Figs. 6, 7 and 8 as comprising a rigid and sturdy A frame structure made up of laterally spaced, coextensive, opposite side beams 15—15, preferably of channel form or of tubular cross-section, joined across their upper ends, in reference to their showing in Fig. 6, by a relatively short connecting member 16. The side beams 15—15 diverge toward their lower ends and near those ends are rigidly joined in spaced relationship by a flat plate 17 of plywood or other suitable material that is rigidly secured by bolts or rivets 18 to the flanges of the beams as has been shown in Fig. 8. Below the plate 17 the beams 15—15 extend in parallel relationship for a short distance and at their lower ends a horizontal cross-axle 19 which, welded or otherwise rigidly fixed thereto at its opposite ends, mounts a pair of ground wheels 20—20 to be used as presently explained.

Near their upper ends, as seen in Fig. 6, and substantially below the end member 16, the A-frame beams 15—15 are connected by a cross-member 22, and mounted at that end of the frame structure, in its central longitudinal plane, is a strong and rigid extension bar 25. It is shown in Figs. 6 and 7 that the inner end portion of bar 25 is slidably fitted in slots 26—27 formed in the cross-members 16 and 22, respectively, and is adjustable in its endwise direction therein. At spaced intervals along its inner end portion the bar 25 has holes 28 formed therethrough, as shown in Fig. 6, through selected ones of which bolts or pins, as at 29 in Fig. 6a may be applied to coact with the cross-members 16 and 22 to secure the adjustment of the bar as extended from the A-frame.

It is also to be observed, more particularly by reference to Figs. 6 and 10, that the upper end portion of the bar 25 is formed in one side edge thereof and in spaced relationship therealong, with recesses 30 and 31. These recesses are spaced at a definite distance for a purpose presently explained in connection with the application of the bar to the swivel S.

To use the present loading and supporting lever as comprised by the above described A-frame structure and extension bar 25, the A-frame is first fixed to the transom wall 10x of the boat in the manner shown in Figs. 6 and 7. Attachment is made while the boat is in upright position by disposing the A-frame in a substantially vertical position, as in Fig. 7, and then positioning the plate 17 that is fixed thereto flatly against the transom wall 10x of the boat. Then bolts, as at 34, are applied through lugs 35 that are welded to the opposite side beams 15—15, as seen in Fig. 6, and through holes 36 in the plate 17 and then through holes 37 in the transom wall above water line, registered therewith, thus to rigidly fix the lever to the boat so that it assumes the relationship thereto in which it is shown in Figs. 7 and 8. It is here noted the wheels 20—20 support the stern end of the boat for rolling movement thereon. To aid in the support of the boat when thus attached to the frame, I have welded brackets 38 to the side beams 15—15 to extend therefrom forwardly as shown in Fig. 7.

To aid in moving the boat into position for car top loading, and also to provide for moving it into and from the water, it is also equipped at its bow end with a pair of caster wheels 42—42 mounted on horizontal axes carried by laterally spaced, vertical stems 42′ that are mounted for axial rotation in a V-shaped seat 43 that is removably applied to the keel of the boat at its prow end as seen in Fig. 4. The boat also is provided with caster mounting sleeves 46 opening laterally from a gunwale portion at points near the prow, and near the stern ends as shown in Fig. 5, for the mounting of caster wheels thereon. It being understood, however, that the caster wheels above mentioned are used to aid in boat ground movements and are not required for the support of the boat when loaded onto the car top.

The device previously referred to as the "swivel" and designated in its entirety by reference character S is shown in detail in Figs. 9, 10 and 11. It comprises a U-shaped attaching or base member 50 with a horizontal bottom portion 51 through which a bolt 52 is extended vertically to fix the member to the top of the trailer hitch 12 for turning action about the axis of the bolt. It is shown in Fig. 10 that the bolt 52 has a head portion seated against the bottom part 51 of the member 50 and has a nut 53 threaded onto and locked to its lower end portion. The opposite side members, or legs, 50′—50′ of the U-shaped member 50 having the lower end portion of a short bar 55 fitted between them and a bolt 56 is extended horizontally through the legs 50′—50′ and through the contained end portion of the bar 55. The connection between parts 50 and 55, as thus provided, is such as to permit the bar 55 to swing on bolt 56 to opposite sides of the U-shaped member 50 from its vertical position, as has been indicated by its dotted line showing in Fig. 9.

The upper end portion of the swivel bar 55 is formed lengthwise thereof and to its full length with a channel 58 and the opposite sidewall portions that define this channel are formed at different levels with horizontally aligned holes, as at 59 and 60 in Fig. 10. A bolt 61 is applied through the holes 59 and is secured by a nut 61′. This bolt is at a right angle to bolt 56. Also, it is shown in Fig. 10 that a pin 62 is removably applied through the holes 60 and 60. This pin has a turning wing 62′ at one end and has a reduced opposite end portion 62x adapted to be threaded into the hole 60 that is positioned to receive that end.

Assuming that the various parts of the A-frame structure and a swivel S are so formed and are applied to the boat and vehicle as illustrated and described, the boat loading operation is as follows: First, while the boat is on land, and in upright position, the loading lever of A-frame is attached to the transom end of the boat, as illustrated in Fig. 7. The bar 25 may then be adjusted therein to the required proper height.

The paired caster wheels 42—42 are then applied to the bow end of the boat by seating the keel end in the V-shaped caster mounting seat 43. To hold the seat 43 in place, it is formed at its base with a slot 44 through which a boss 45 on the keel is projected and secured by a pin 46 as shown in Fig. 4. The boat will now be supported at its stern end by the paired wheels 20—20 of the A-frame and at its prow end by the caster wheels 42—42. It can then be easily rolled on these wheels to loading position back of the car.

The boat is then positioned as shown in dash lines in Fig. 1, with its stern end adjacent trailer hitch 12 but set to one side of the line of the car. The caster wheels 42—42 may then be removed by detachment of the seat 43. The two casters may then be pulled from their mounting bearings in the seat 43 and individually applied to the gunwale sockets as shown in Fig. 1.

With the loading lever so attached to the boat and the casters so applied, the user grasps the top end of the bar 25 and pulls it laterally toward the car as indicated by the arrow a in Fig. 1 to the "on edge" position in which it is shown in full lines. With this movement, the end of the extension bar 25 may be brought into position for its attachment to the swivel.

Attachment of the lever requires, first, that the channeled side of the swivel bar 55 be faced directly toward the stern end of the boat and that the pin 62 be removed from the bar. With this accomplished the end of bar 25 is swung downwardly to cause its end portion to enter the channel 58 as seen in Fig. 10, and the recess 31 of the bar to receive the bolt 61. Then by lifting the stern end of the boat while its prow rests on the ground, and swinging it from the "on edge" position of Fig. 1 to the inverted position of Fig. 2, the bar 25 will be received in the channel 58 as in Fig. 10. As this is done the bar 55 pivots on the bolt 56 to accommodate it to the position of the boat. The pin 62 is then applied to bar 55 to secure the extension bar 25. The parts 25 and 55 then assume that position relative to the hitch 12 in which they are shown in Fig. 2. It is to be understood that when the A-frame structure swings to the position shown in Fig. 2 and the bar 25 is locked in the channel of bar 55 by insertion of pin 62, the stern end of the boat cannot swing toward either side due to the face that the lower end of bar 55 is then supported between the legs 50′—50′ of the swivel base member 50 as observed in Fig. 10. The operator then lifts the prow end of the boat and carries it laterally and forwardly about the swivel axis or bolt 52 and places its end on the car top. The boat then is in the position in which it is shown in dash lines in Fig. 2.

In placing the boat on the car stop, it may be rested upon any suitable form of cross-bar support to which it may be secured, or it can be rested on the top and secured by the usual gutter strip ties. The casters applied to the boat may be removed during transportation, if desired.

The unloading of the boat from the car top is accomplished merely by reversing the successive steps of the loading operation. However, it is desirable if the boat is to be launched after unloading that when in that full line position in which it is shown in Fig. 2, that the caster seat 43 be applied to the prow end and that the casters 42—42 be placed in position therein. Then, when the boat has been swung to the detached position, shown by dash lines in Fig. 1, at which it is supported by the casters and wheels 20—20, it can be pushed stern end first into the water. Before the prow end reaches the water, the caster seat 43 should be detached and placed in the boat. Also, the bar 25 may be withdrawn from the A-frame before launching, and left with the automobile. After the boat has been launched, the A-frame may be detached, if desired, and placed in the bow of the boat. Its shape makes it easy to store without inconvenience.

When the boat is to be landed, the A-frame is lifted from the boat, lowered into the water, and secured to the transom. It is a feature of the A-frame construction, that in case the boat is equipped with an outboard motor, as indicated in Fig. 7, the A-frame can be lowered into the water back of the motor, and below it, then brought forward and lifted into position, and secured. In its secured position it will support the boat as rolled onto shore, at such height above the surface on which the wheels 20—20 are rolled that the motor need not be detached from the boat until it is desired to place the boat on the car top.

It is also possible for the A-frame structure when detached from the boat, to be conveniently used as a wheeled carrier or dolly for transportation of the motor to and from the boat. When so used, the motor is clamped onto the plate 17 in the same manner as it is clamped onto the transom of the boat. It can then be supported by the wheels 20—20 while moved from place to place. To aid in use of the A-frame for this particular purpose the frame is equipped at its lower end with a supporting yoke 40 of U-shape having a base member 40′ and opposite side legs 40a—40a that are pivoted at their ends on the opposite ends of cross-axle 19. This frame can be swung to the position in which it is shown in Fig. 7 where it is stopped against farther upward movement and thus serves to hold the frame in an upright position. By lifting the frame, this yoke can be swung to a forward position, clear of the ground surface.

In Fig. 12, I have illustrated another use for the A-frame as attached to the car to support one end of the boat while it is supported at its other end by a frame. This permits use of the boat as the top of a shelter tent applied as illustrated.

What I claim as new is:

1. A car top boat loader for use with a car of the character described having a support fixed thereto at its rear end medially of its opposite sides and approximately at bumper level; said loader comprising a swivel base member pivotally mounted on said support for turning only about a vertical axis, a connector bar normally extended upwardly from said swivel base and pivotally fixed thereto at its lower end for swinging movement about a horizontal axis away from and toward its upright position, a standard adapted to be fixed rigidly at its lower end to the stern end wall of a boat to be loaded, to extend upwardly therefrom, and adapted upon tipping the boat sideways to dispose the standard in a horizontal position for pivotal attachment at its upper end to said connector bar at a point near said swivel base while disposed substantially at a right angle to said bar and about which point of pivotal attachment said standard may then be swung to an upright position closely along said bar, and a locking means applicable to said bar and standard for normally retaining them rigidly in that relationship.

2. The device of claim 1 wherein the said standard comprises a rigid lower end frame that is adapted for fixed and rigid securement to the stern end wall of a boat, and an upper end extension bar telescopically mounted in said lower end frame and means for securing the extension bar at different positions of adjustment.

3. The device of claim 2 wherein said lower end frame is equipped with a pair of ground wheels for rolling support of that end of the boat when said frame is attached thereto.

4. The device of claim 1 wherein said standard comprises a rigid, transversely directed frame structure which is equipped at opposite sides of its lower end with a pair of ground wheels for rolling support of the stern end of the boat to which the frame may be attached, and wherein said lower end frame structure includes a flat transversely directed plate fixed rigidly thereto and adapted to be disposed flatly against the stern end wall of the boat, and bolts applied through opposite ends of said plate for its attachment to said stern end wall.

5. The device of claim 1 wherein said swivel base is of U-form and wherein the lower end portion of said connector bar is disposed between the laterally spaced leg portions thereof and is fixed therein by a pivot bolt extended horizontally through said legs and bar.

6. The device of claim 1 wherein said connector bar is longitudinally channeled along one side from near its pivoted end through its upper end and wherein said standard, after being pivotally joined thereto at its upper end, is adapted to be swung upwardly and seated at that end in said channel, and wherein the means for effecting the rigid connection of standard and bar comprises a bolt that is passed through the upper end portion of the bar and the channel enclosed portion of the bar.

7. The device of claim 6 wherein the channeled side of said connector bar faces laterally of the plane in which said bar is adapted to swing on its pivot axis.

8. A car top boat loader for use with a car of the character described having a support member fixed thereto at its rear end substantially at bumper level, said loader comprising a substantially U-shaped swivel base mounted upon said support by a vertical pivot member through its base wall, a connector bar disposed in upright position with its lower end portion disposed between the spaced legs of said U-shaped swivel base, a hinge bolt passed horizontaly through said legs and the contained portion of said bar to permit lateral swinging of said bar at its upper end, said bar being formed along a side that faces laterally of the plane in which it swings, with a channel extending from near said swivel base through its upper end, a standard equipped at its lower end for rigid mounting on the stern end wall of a boat to extend upwardly therefrom; said standard being formed at its upper end and in a side edge thereof with a notch, and said bar channel being adapted to receive the notched end portion of said bar therein when said standard is substantially horizontal and inclined substantially at a right angle to the bar, and said bar having a pin fixed therein transversely through the channel for seating in the notch of the bar to provide a pivotal holding connection about which the standard may be swung upwardly and seated in the channel, and a locking pin removably applicable to the upper end of said bar through the channel to retain bar and standard in rigid connection.

References Cited in the file of this patent

UNITED STATES PATENTS

| | | |
|---|---|---|
| 2,521,815 | Will | Sept. 12, 1950 |
| 2,561,199 | Harder | July 17, 1951 |
| 2,631,806 | Harder et al. | Mar. 17, 1953 |
| 2,753,063 | Abel | July 3, 1956 |